US012627244B2

(12) United States Patent
Mukunoki et al.

(10) Patent No.: US 12,627,244 B2
(45) Date of Patent: May 12, 2026

(54) POWER CONVERSION DEVICE AND CONTROL DEVICE

(71) Applicant: Mitsubishi Electric Corporation, Tokyo (JP)

(72) Inventors: Kaho Mukunoki, Tokyo (JP); Toshiyuki Fujii, Tokyo (JP); Ryosuke Uda, Tokyo (JP); Kota Hamanaka, Tokyo (JP); Shuhei Fujiwara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 253 days.

(21) Appl. No.: 18/694,054

(22) PCT Filed: Oct. 7, 2021

(86) PCT No.: PCT/JP2021/037193
§ 371 (c)(1),
(2) Date: Mar. 21, 2024

(87) PCT Pub. No.: WO2023/058196
PCT Pub. Date: Apr. 13, 2023

(65) Prior Publication Data
US 2024/0388221 A1        Nov. 21, 2024

(51) Int. Cl.
*H02M 7/5387*        (2007.01)
(52) U.S. Cl.
CPC .............................. *H02M 7/53871* (2013.01)
(58) Field of Classification Search
CPC ........................ H02M 7/53871; H02M 7/5387
See application file for complete search history.

(56) References Cited

U.S. PATENT DOCUMENTS

| | | | |
|---|---|---|---|
| 2016/0006338 A1 | 1/2016 | Sakimoto et al. | |
| 2024/0275165 A1* | 8/2024 | Fujii .......................... | H02J 3/32 |
| 2024/0297597 A1* | 9/2024 | Mukunoki .......... | H02M 1/0025 |
| 2025/0192660 A1* | 6/2025 | Uemura ................ | H02M 1/325 |

FOREIGN PATENT DOCUMENTS

| JP | 2019080476 A | 5/2019 |
|---|---|---|

OTHER PUBLICATIONS

Extended European Search Report dated Nov. 11, 2024, issued in the corresponding European Patent Application No. 21959938.8, 8 pages.
International Search Report (PCT/ISA/210) with English translation and Written Opinion (PCT/ISA/237) mailed Dec. 28, 2021, by the Japanese Patent Office as the International Searching Authority for International Application No. PCT/JP2021/037193, 8pgs.

* cited by examiner

*Primary Examiner* — Adolf D Berhane
(74) *Attorney, Agent, or Firm* — BUCHANAN, INGERSOLL & ROONEY PC

(57)        ABSTRACT

A current suppression control unit calculates a correction amount of a reference voltage command value for operating a power converter as a voltage source, and sets an amplitude value of a voltage command value by reflecting the correction amount in an amplitude value of the reference voltage command value. The correction amount is set to make the amplitude value of the voltage command value smaller than the amplitude value of the reference voltage command value, in response to a decrease in an AC voltage at an interconnection point.

15 Claims, 6 Drawing Sheets

POWER CONVERSION DEVICE AND CONTROL DEVICE

TECHNICAL FIELD

The present disclosure relates to a power conversion device and a control device.

BACKGROUND ART

In recent years, renewable energy generated by dispersed-type power sources such as solar power generation facilities have been introduced into power systems. Since a dispersed-type power source is connected to a power system via a power converter, if the amount of introduced renewable energy increases, the ratio of synchronous generators connected to the power system decreases, and thereby there is a concern that an inertia force of the power system with respect to frequency change may decrease.

Thus, there has been proposed virtual synchronous generator control that compensates for a decreased inertia force by causing a power conversion device interconnected to a system to perform a behavior similar to that of a synchronous generator. Specifically, a power converter having a voltage control-type virtual synchronous generator control function (hereinafter also referred to as a "virtual synchronous generator") is controlled to simulate a behavior in a case where a synchronous power generator to be simulated is connected to a power system.

For example, Japanese Patent Laying-Open No. 2019-80476 (PTL 1) describes that, in computing a voltage command value for an alternating current (AC)/direct current (DC) converter according to an output command value for virtual synchronous generator control, if a short circuit accident occurs in a power system, an output current suppression unit performs control to change an internal impedance of a virtual synchronous generator such that an output current of the AC/DC converter may not exceed a current limit value.

CITATION LIST

Patent Literature

PTL 1: Japanese Patent Laying-Open No. 2019-80476

SUMMARY OF INVENTION

Technical Problem

Since a virtual synchronous generator operates as a voltage source, if a short circuit accident occurs in a power system and a voltage at an interconnection point decreases, a voltage difference between an output voltage of the virtual synchronous generator and the voltage at the interconnection point increases. Thus, an output current of a power converter becomes excessive, and thereby the power converter is stopped for protection, which poses a problem.

To deal with this problem, in PTL 1, if a short circuit accident occurs in the power system, control is performed to change the internal impedance of the virtual synchronous generator and compute the voltage command value as a voltage source, to thereby decrease the voltage difference such that an excess current may not occur. Therefore, in the technique of PTL 1, in order to obtain an appropriate current suppression effect in case of a system accident, it is necessary to set the amount of change of the internal impedance of the virtual synchronous generator as appropriate.

However, since a system impedance changes depending on a load state and the like, and also changes depending on the manner of a short circuit accident, it becomes difficult to make the amount of change (the increased amount) of the internal impedance of the virtual synchronous generator in the output current suppression unit of PTL 1 appropriate to correspond to the system impedance. As a result, there is a concern that the effect of suppressing an excess current may not be stably obtained.

An object in an aspect of the present disclosure is to provide a power conversion device and a control device capable of stably performing control that operates a power converter interconnected to a power system as a voltage source and suppresses occurrence of an excess current.

Solution to Problem

According to an embodiment of the present disclosure, a power conversion device is provided. The power conversion device includes at least one power converter configured to include switching elements, and a control device to control power conversion in the power converter. The power converter converts DC power from a DC power source into AC power and outputs the AC power to a power system. The control device includes a voltage control unit, a current suppression control unit, and a switching control unit. The voltage control unit generates a reference voltage command value for operating the power converter as a voltage source that outputs an AC voltage having a frequency and a phase which are different from those in the power system. The current suppression control unit generates a voltage command value for the power converter using an AC voltage at an interconnection point of the power converter with respect to the power system and the reference voltage command value. The switching control unit controls turning on/off of the switching elements of the power converter according to the voltage command value. The current suppression control unit has a first correction computation unit and an amplitude correction unit. The first correction computation unit computes a first correction amount for making an amplitude value of the voltage command value smaller than an amplitude value of the reference voltage command value, in response to a decrease in the AC voltage at the interconnection point, using an amplitude value of the AC voltage at the interconnection point. The amplitude correction unit sets the amplitude value of the voltage command value by reflecting the first correction amount in the amplitude value of the reference voltage command value.

According to another embodiment of the present disclosure, a control device for a power converter configured to include switching elements, for converting DC power from a DC power source into AC power and outputting the AC power to a power system is provided. The control device includes a voltage control unit, a current suppression control unit, and a switching control unit. The voltage control unit generates a reference voltage command value for operating the power converter as a voltage source that outputs an AC voltage having a frequency and a phase which are different from those in the power system. The current suppression control unit generates a voltage command value for the power converter using an AC voltage at an interconnection point of the power converter with respect to the power system and the reference voltage command value. The switching control unit controls turning on/off of the switching elements of the power converter according to the voltage command value. The current suppression control unit includes a first correction computation unit and an amplitude correction unit. The first correction computation unit computes a first correction amount for making an amplitude value of the voltage command value smaller than an amplitude value of the reference voltage command value, in response to a decrease in the AC voltage at the interconnection point, using an amplitude value of the AC voltage at the interconnection point. The amplitude correction unit sets the amplitude value of the voltage command value by reflecting the first correction amount in the amplitude value of the reference voltage command value.

Advantageous Effects of Invention

According to the present disclosure, it is possible to stably perform control that operates a power converter interconnected to a power system as a voltage source and suppresses occurrence of an excess current.

DESCRIPTION OF EMBODIMENTS

Figures 1, 2:
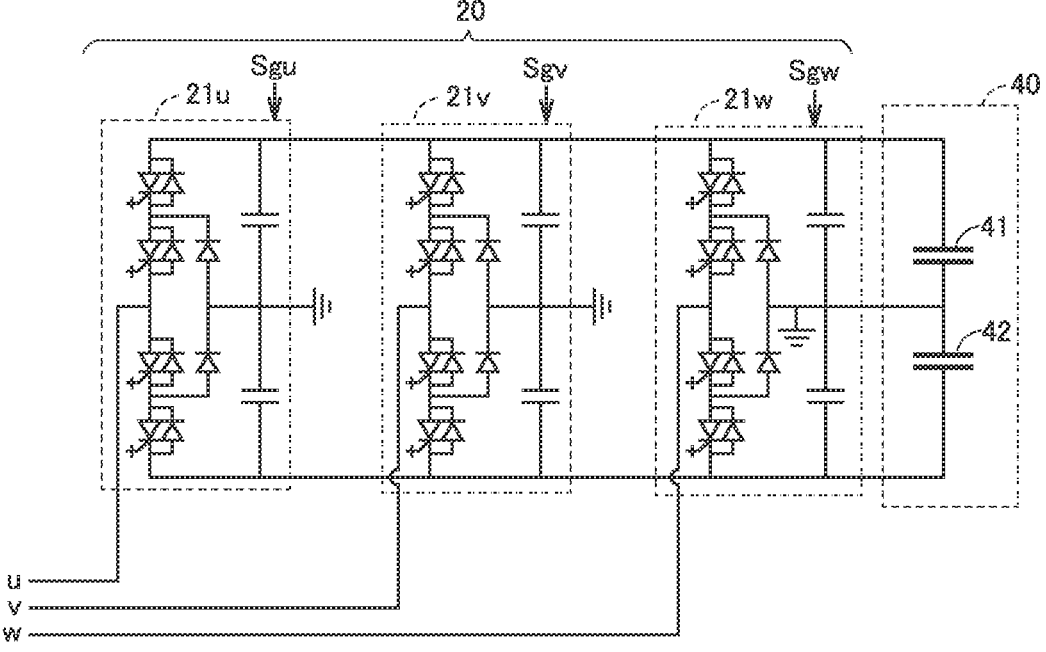
FIG. 1 is a block diagram illustrating a configuration of a power conversion system as an example of application of a power conversion device in accordance with the present embodiment.
FIG. 2 is a circuit diagram showing an exemplary configuration of a power converter shown in FIG. 1.

Hereinafter, an embodiment of the present disclosure will be described in detail with reference to the drawings. It should be noted that, in the following, identical or corresponding parts in the drawings will be designated by the same numerals, and the description thereof will not be repeated in principle.

Hereinafter, an embodiment of the present disclosure will be described in detail with reference to the drawings. It should be noted that, in the following, identical or corresponding parts in the drawing will be designated by the same numerals and the description thereof will not be repeated in principle.

<Description of System Configuration>

FIG. 1 is a block diagram illustrating a configuration of a power conversion system as an example of application of a power conversion device in accordance with the present embodiment. The power conversion system includes a power system 2, a voltage transformer 3, a power conversion device 6, a current detector 7, a voltage detector 8, and a power storage element 40. Power conversion device 6 includes a control device 10 and a power converter 20.

Power converter 20 performs DC/AC power conversion between power storage element 40 that stores DC power and three-phase AC power system 2. Specifically, power converter 20 is connected to power system 2 via voltage transformer 3, to convert DC power from power storage element 40 into AC power and output the AC power to power system 2. On this occasion, power converter 20 is controlled by control device 10 as a voltage source, as described later.

FIG. 2 shows a circuit diagram illustrating an exemplary configuration of power converter 20.

Referring to FIG. 2, power storage element 40 includes capacitors 41 and 42 connected in series. It should be noted that, as power storage element 40, a DC power storage element including a secondary battery is arbitrarily applicable instead of a capacitor. Power storage element 40 corresponds to one embodiment of a "DC power source".

Power converter 20 has three-level inverters 21u, 21v, and 21w as three-level converters. Each of three-level inverters 21u, 21v, and 21w is a known configuration having four switching elements constituted by triacs, and converts a DC voltage of capacitors connected in parallel with power storage element 40 into a sinusoidal AC voltage by pulse width modulation (PWM) control of the four switching elements.

On/off control signals Sgu, Sgv, and Sgw inputted into three-level inverters 21u, 21v, and 21w, respectively, shown in FIG. 2 each collectively indicate on/off control signals of the four switching elements (four signals) in each three-level inverter which are generated by the PWM control.

Three-level inverters 21u, 21v, and 21w output the sinusoidal AC voltages having phases different from each other by 120 degrees, to three-phase transmission lines, respectively. Thereby, power converter 20 operates as a three-phase three-level converter.

It should be noted that power converter 20 can be constituted by a self-commutated converter such as a two-level converter or a modular multilevel converter, as long as it has a DC/AC power conversion function. Further, as for the DC side, that is, the "DC power source", a DC system constituted by a DC transmission line may be connected instead of power storage element 40.

Referring to FIG. 1 again, current detector 7 detects three-phase AC currents of power system 2. Specifically, current detector 7 detects an AC current Ia of an a phase, an AC current Ib of a b phase, and an AC current Ic of a c phase of power system 2 (more specifically, an interconnection point 9 of power converter 20). AC currents Ia, Ib, and Ic are inputted into control device 10. In the following, AC currents Ia, Ib, and Ic are also collectively referred to as an AC current Isys.

Voltage detector 8 detects three-phase AC voltages of power system 2 (more specifically, interconnection point 9 of power converter 20). For example, voltage detector 8 detects an AC voltage Va of the a phase, an AC voltage Vb of the b phase, and an AC voltage Vc of the c phase of power system 2. AC voltages Va, Vb, and Vc are inputted into control device 10. In the following, AC voltages Va, Vb, and Vc are also collectively referred to as an AC voltage Vsys.

Control device 10 includes a voltage control unit 12, a three-phase voltage command generation unit 14, a PWM control unit 16, and a current suppression control unit 101, as functions of controlling power converter 20.

Figure 3:
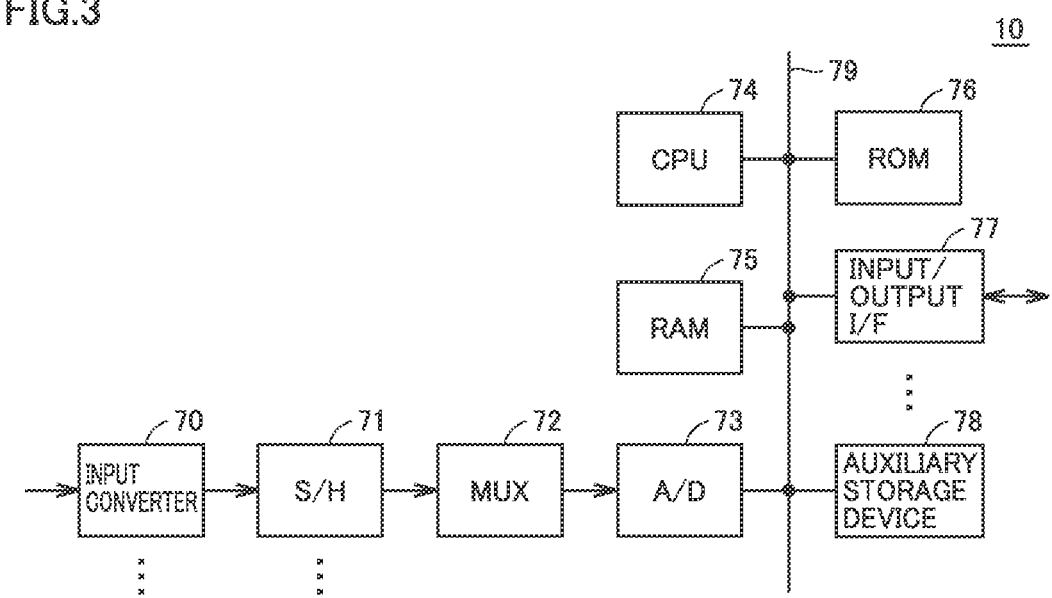
FIG. 3 is a block diagram showing an exemplary hardware configuration of a control device shown in FIG. 1.

FIG. 3 shows an exemplary hardware configuration of control device 10. FIG. 3 shows an example in which control device 10 is constituted by a computer.

Referring to FIG. 3, control device 10 includes one or more input converters 70, one or more sample hold (S/H) circuits 71, a multiplexer (MUX) 72, an A/D converter 73, one or more CPUs (Central Processing Units) 74, a RAM (Random Access Memory) 75, a ROM (Read Only Memory) 76, one or more input/output interfaces 77, and an auxiliary storage device 78. Further, control device 10 includes a bus 79 that mutually connects the components.

Input converter 70 has an auxiliary transformer for each input channel. Each auxiliary transformer converts signals detected by current detector 7 and voltage detector 8 in FIG. 1 into signals having a voltage level suitable for subsequent signal processing.

Sample hold circuit 71 is provided for each input converter 70. Sample hold circuit 71 samples a signal indicating the amount of electricity received from corresponding input converter 70 using a defined sampling frequency, and holds the signal.

Multiplexer 72 sequentially selects the signals held in a plurality of sample hold circuits 71. A/D converter 73 converts a signal selected by multiplexer 72 into a digital value. It should be noted that A/D conversion may be performed in parallel on detection signals of a plurality of input channels by providing a plurality of A/D converters 73.

CPU 74 controls entire control device 10, and performs computation processing according to a program. RAM 75 as a volatile memory and ROM 76 as a nonvolatile memory are used as main storages for CPU 74. ROM 76 stores programs, set values for signal processing, and the like. Auxiliary storage device 78 is a nonvolatile memory having a capacity larger than that of ROM 76, and stores programs, data of electricity amount detection values, and the like.

Input/output interface 77 is an interface circuit in communicating between CPU 74 and an external device.

It should be noted that it is also possible to constitute at least a portion of control device 10 using a circuit such as an FPGA (Field Programmable Gate Array) and an ASIC (Application Specific Integrated Circuit), unlike the example in FIG. 2. Referring to FIG. 1 again, the functions of voltage control unit 12, three-phase voltage command generation unit 14, PWM control unit 16, and current suppression control unit 100 are implemented by hardware processing and/or software processing by control device 10.

Voltage control unit 12 generates a d-axis voltage command value Vdbs and a q-axis voltage command value Vqbs on a two-axis (d-q axis) rotating coordinate system, as voltage command values for operating power converter 20 as a virtual synchronous generator. In the following, voltage command values Vdbs and Vqbs generated by voltage control unit 12 will be referred to as reference voltage command values Vdbs and Vqbs.

Current suppression control unit 100 generates final voltage command values Vd* and Vq* on the two axes, by reflecting the amount of correction by current suppression control for suppressing an excessive current, in reference voltage command values Vdbs and Vqbs.

Three-phase voltage command generation unit 14 transforms voltage command values Vd* and Vq* on the d-q axes from current suppression control unit 100, into three-phase voltage command values Vu*, Vv*, and Vw*, by predefined two-phase/three-phase coordinate transformation. Voltage command values Vu*, Vv*, and Vw* are sinusoidal voltages having phases deviated from each other by 120 degrees.

PWM control unit 16 generates on/off control signals Sgu, Sgv, and Sgw for the four switching elements of each of three-level inverters 21*u*, 21*v*, and 21*w* shown in FIG. 2, by the PWM control that compares each of three-phase voltage command values Vu*, Vv*, and Vw* with a carrier signal.

Three-level inverter 21*u* outputs a sinusoidal AC voltage according to voltage command value Vu* by on/off operation of the four switching elements according to on/off control signal Sgu. Similarly, three-level inverter 21*v* outputs a sinusoidal AC voltage according to voltage command value Vv* by switching operation according to on/off control signal Sgv, and three-level inverter 21*w* outputs a sinusoidal AC voltage according to voltage command value Vw* by switching operation according to on/off control signal Sgw. It is to be understood that, through such a switching operation, power converter 20 operates as a voltage source that outputs an AC voltage having an amplitude and a phase which are different from those in power system 2.

It should be noted that, in voltage control unit 12, reference voltage command values Vdbs and Vqbs for simulating a behavior in a case where a synchronous power generator is connected to the power system can be produced by any known technique. For example, in PTL 1, d-q axis voltage command values obtained by performing three-phase/two-phase transformation on (three-phase) voltage command values generated in a state where operation of the output current suppression unit is stopped and the internal impedance is set constant are equivalent to reference voltage command values Vdbs and Vqbs generated by voltage control unit 12.

That is, in the present embodiment, when the voltage command values are not corrected by current suppression control unit 100, the voltage command values are directly set as Vd*=Vdbs and Vd*=Vqbs, and power converter 20 is controlled as a voltage source for ordinary virtual synchronous generator control.

<Detailed Description of Control System>

Next, a configuration of current suppression control unit 100 for suppressing an excessive current arranged in the present embodiment will be described.

Figure 4:
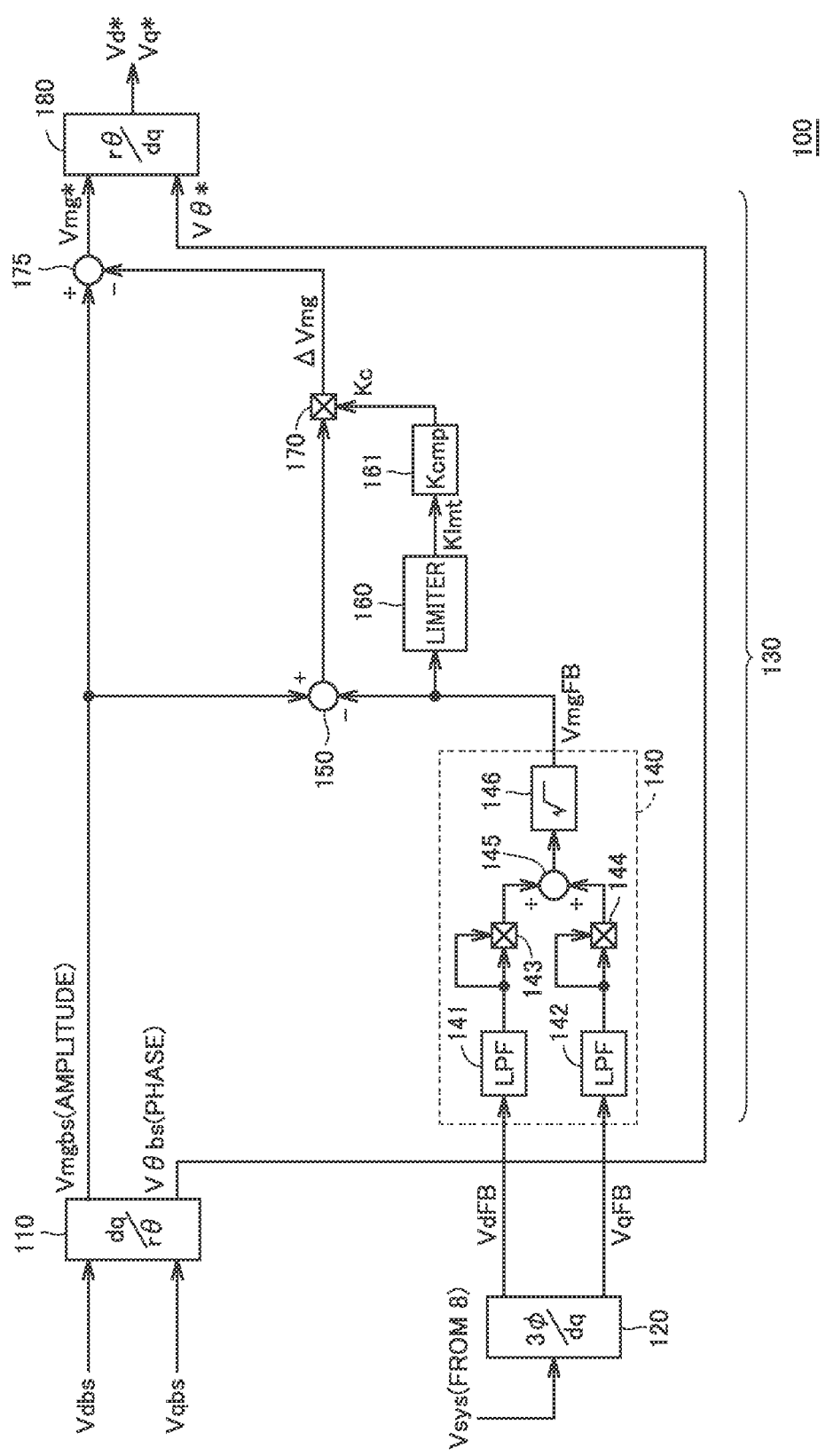
FIG. 4 is a block diagram illustrating a configuration of a current suppression control unit shown in FIG. 1.

FIG. 4 is a block diagram illustrating a configuration of current suppression control unit 100.

As shown in FIG. 4, current suppression control unit 100 includes a polar coordinate transformation unit 110, a three-phase/two-phase coordinate transformation unit 120, a voltage command amplitude correction unit 130, and a polar coordinate inverse transformation unit 180.

Polar coordinate transformation unit 110 performs polar coordinate (rθ) transformation on reference voltage command values Vdbs and Vqbs generated by voltage control unit 12, on the two-axis rotating coordinate system (d-q axes), and thereby outputs an amplitude value Vmgbs (a reference amplitude value) and a phase Vθbs (a reference phase) of the reference voltage command values. Reference amplitude value Vmgbs and reference phase Vθbs are indicated by the following equations (1) and (2).

$$Vmgbs = \sqrt{(Vdbs^2 + Vqbs^2)} \tag{1}$$

$$V\theta bs = \tan^{-1}(Vqbs/Vdbs) \tag{2}$$

Three-phase/two-phase coordinate transformation unit 120 performs three-phase/two-phase (3φ/dq) transformation on (three-phase) AC voltage Vsys at interconnection point 9 detected by voltage detector 8, and generates a d-axis voltage VdFB and a q-axis voltage VqFB of the two-axis rotating coordinate system. In the following, d-axis voltage VdFB and q-axis voltage VqFB will also be referred to as "feedback voltages".

Voltage command amplitude correction unit 130 has an amplitude computation unit 140, an amplitude deviation computation unit 150, a limiter 160, an adjustment gain multiplication unit 161, a multiplier 170, and a subtractor 175.

Amplitude computation unit 140 calculates a feedback amplitude value VmgFB that is an amplitude of d-axis feedback voltage VdFB and q-axis feedback voltage VqFB. Amplitude computation unit 140 has low pass filters (LPFs) 141 and 142, multipliers 143 and 144 for square computation, an adder 145, and a radical computation element 146.

Low pass filters 141 and 142 can be constituted by moving average filters or the like. The square sum (VdFB$^2$+ VqFB$^2$) of feedback voltages VdFB and VqFB from which a high frequency component has been removed is calculated by multipliers 143 and 144 and adder 145. Radical computation element 146 outputs the voltage amplitude value (VmgFB) of feedback voltages VdFB and VqFB from which the high frequency component has been removed.

Amplitude deviation computation unit 150 outputs an amplitude deviation value obtained by subtracting feedback amplitude value VmgFB from reference amplitude value Vmgbs (Vmgbs−VmgFB).

Limiter 160 sets a limit gain Klmt according to feedback amplitude value VmgFB. Adjustment gain multiplication unit 161 multiplies limit gain Klmt by an adjustment gain Kcmp, and thereby outputs a correction gain Kc. Although adjustment gain Kcmp is basically 1.0, it can be set as 0<Kemp<1, or Kcmp>1, if needed. In the following, adjustment gain Kcmp is set as Kcmp=1.0 for ease of description.

Multiplier 170 outputs a multiplication value of the amplitude deviation (Vmgbs−VmgFB) outputted from amplitude deviation computation unit 150 and correction gain Kc, as an amplitude correction amount ΔVmg.

Figure 5:
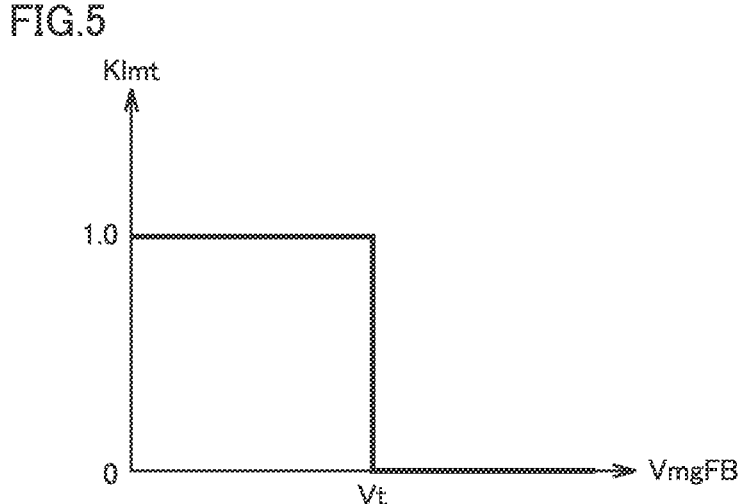
FIG. 5 is a conceptual diagram illustrating an example of setting of a limit gain by a limiter shown in FIG. 4.

FIG. 5 shows a conceptual diagram illustrating an example of setting of limit gain Klmt by limiter 160.

As shown in FIG. 5, when feedback amplitude value VmgFB is less than a predefined determination value Vt, limit gain Klmt is set as Klmt=1.0 to turn on amplitude correction for the voltage command values. On the other hand, when feedback amplitude value VmgFB is more than or equal to the determination value, limit gain Klmt is set as Klmt=0 to turn off the amplitude correction for the voltage command values.

Determination value Vt is set corresponding to a predefined determination value Vmin for detecting a decrease in AC voltage Vsys at the interconnection point. For example, when the amplitude value of AC voltage Vsys becomes less than or equal to determination value Vmin, determination value Vt is set to achieve VmgFB≤Vt, by reflecting an amplitude transformation ratio in three-phase/two-phase transformation in three-phase/two-phase coordinate transformation unit 120, if necessary.

Referring to FIG. 4 again, it is to be understood that, when limit gain Klmt is set as Klmt=0, correction gain Kc is also set to 0, and thus amplitude correction amount ΔVmg is set as ΔVmg=0. On the other hand, it is to be understood that, when limit gain Klmt is set as Klmt=1, correction gain Kc is set as Kc=1.0, and thus amplitude correction amount ΔVmg is set as ΔVmg=Vmgbs−VmgFB.

Subtractor 175 subtracts amplitude correction amount ΔVmg from reference amplitude value Vmgbs, and thereby outputs a voltage command amplitude value Vmg* in which amplitude correction amount ΔVmg is reflected. When the voltage at interconnection point 9 decreases and feedback amplitude value VmgFB becomes less than determination value Vt due to the setting of limit gain Klmt described above, voltage amplitude command value Vmg* is set according to an equation (3).

$$Vmg^* = Vmgbs - (Vmgbs - VmgFB) = VmgFB \qquad (3)$$

It should be noted that, when adjustment gain Kcmp described above is set as Kcmp≠1.0, equation (3) is expressed as Vmg*=Kcmp·VmgFB. In this manner, when the voltage at the interconnection point decreases, voltage amplitude command value Vmg* is corrected to be set according to an actual voltage amplitude value at the interconnection point, rather than voltage amplitude command value Vmg*.

On the other hand, when the voltage at the interconnection point does not decrease and feedback amplitude value VmgFB is more than or equal to determination value Vt, amplitude correction amount ΔVmg is set as ΔVmg=0, and thus reference amplitude value Vmgbs is set as voltage amplitude command value Vmg* (Vmg*=Vmgbs) without correction. That is, voltage amplitude command value Vmg* is set according to reference amplitude value Vmgbs.

Further, as a voltage phase command value Vθ*, reference phase Vθbs calculated in polar coordinate transformation unit 110 is directly set.

In this manner, in the exemplary configuration in FIG. 4, amplitude correction amount ΔVmg corresponds to one embodiment of a "first correction amount" for making voltage amplitude command value Vmg* smaller than reference amplitude value Vmgbs in response to a decrease in AC voltage Vsys at interconnection point 9. Amplitude computation unit 140, amplitude deviation computation unit 150, limiter 160, adjustment gain multiplication unit 161, and multiplier 170 can constitute one embodiment of a "first correction computation unit". Further, subtractor 175 corresponds to one embodiment of an "amplitude correction unit".

Polar coordinate inverse transformation unit 180 generates three-phase voltage command values Vu*, Vv*, and Vw* from voltage amplitude command value Vmg* and voltage phase command value Vθ* represented in polar coordinates on the two-axis rotating coordinate axes.

In polar coordinate inverse transformation unit 180, voltage amplitude command value Vmg* and voltage phase command value Vθ* are transformed into d-axis voltage command value Vd* and q-axis voltage command value Vq*, according to equations (4) and (5).

$$Vd^* = Vmg^* \cdot \cos(V\theta^*) \qquad (4)$$

$$Vq^* = Vmg^* \cdot \sin(V\theta^*) \qquad (5)$$

d-axis voltage command value Vd* and q-axis voltage command value Vq* obtained by equations (4) and (5) are inputted into three-phase voltage command generation unit 14 shown in FIG. 1. Three-phase voltage command generation unit 14 transforms the voltage command values into three-phase voltage command values Vu*, Vv*, and Vw*, by the predefined two-phase/three-phase coordinate transformation, that is, inverse transformation of the three-phase/two-phase transformation in three-phase/two-phase coordinate transformation unit 120. Furthermore, PWM control unit 16 shown in FIG. 1 generates on/off control signals Sgu, Sgv, and Sgw for the four switching elements of each of three-level inverters 21u, 21v, and 21w shown in FIG. 2, by the PWM control according to voltage command values Vu*, Vv*, and Vw* from three-phase voltage command generation unit 14. That is, three-phase voltage command generation unit 14 and PWM control unit 16 can constitute one embodiment of a "switching control unit".

When amplitude correction amount ΔVmg is set as ΔVmg=0, that is, when the amplitude correction for the voltage command values is turned off, d-axis voltage command value Vd* and q-axis voltage command value Vq* are set according to d-axis reference voltage command value Vdbs and q-axis reference voltage command value Vqbs from voltage control unit 12 (Vd*=Vdbs, Vq*=Vqbs).

In contrast, when the amplitude of the voltage command values is corrected by amplitude correction amount ΔVmg with the limit gain being set to 1.0, d-axis voltage command value Vd* and q-axis voltage command value Vq* are set to have a voltage amplitude equal to the actual voltage amplitude value at the interconnection point.

In this manner, in the present embodiment, in a normal state where the voltage amplitude at the interconnection point does not decrease to determination value Vmin, the amplitude correction for the voltage command values is turned off, and power converter 20 can be operated as a virtual synchronous generator according to reference voltage command values Vdbs and Vqbs from voltage control unit 12.

In contrast, when the voltage amplitude at the interconnection point decreases to determination value Vmin due to occurrence of a grounding accident or the like in power system 2, the current suppression control that decreases the amplitude (Vmg*) of the voltage command values to be lower than reference amplitude value Vmgbs can prevent an output current of power converter 20 from becoming excessive due to an increased voltage difference between an output voltage of power converter 20 controlled as a voltage source and a voltage at the interconnection point.

On this occasion, by setting the amplitude of the voltage command values using the feedback value (VmgFB) of the voltage amplitude at interconnection point 9, the output current suppression control described above can be implemented without grasping an impedance of power system 2.

In this manner, according to the power conversion device in accordance with the present embodiment, in control that operates the power converter interconnected to the power system as a voltage source, if the voltage at the interconnection point of the power converter decreases due to a grounding accident or the like in the power system, it is possible to stably perform control that suppresses occurrence of an excess current.

<Variation of Current Suppression Control Unit>

Figure 6:
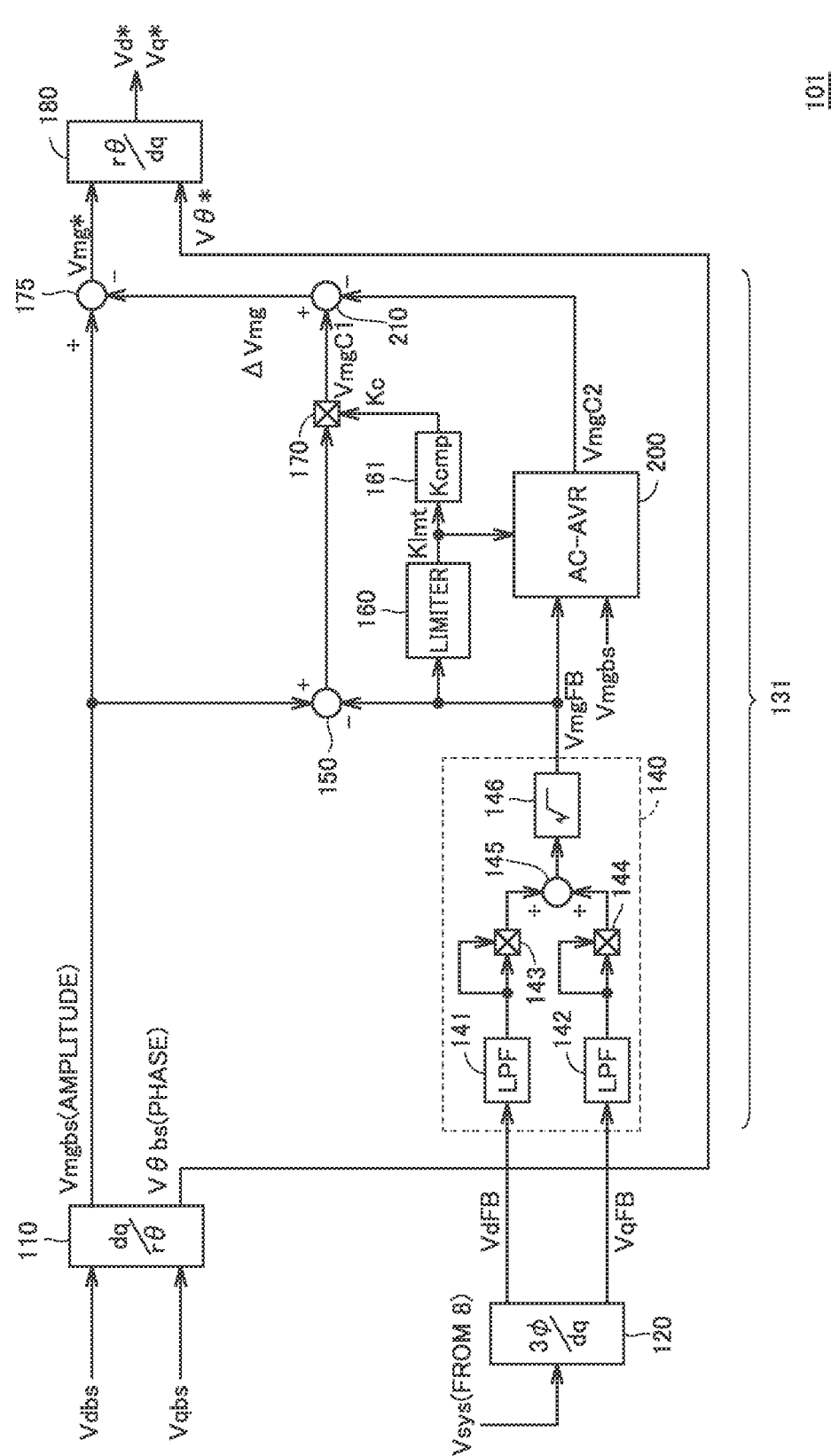
FIG. 6 is a block diagram illustrating a variation of the current suppression control unit.

FIG. 6 shows a block diagram illustrating a variation of the current suppression control unit.

A current suppression control unit 101 in accordance with the variation shown in FIG. 6 is different from current suppression control unit 100 in FIG. 4 in that it includes a voltage command amplitude correction unit 131 instead of voltage command amplitude correction unit 130. In addition to the configuration of voltage command amplitude correction unit 130, voltage command amplitude correction unit 131 further includes an automatic voltage regulator (AC-VCR) 200 and a subtractor 210. Other than that, the configuration of voltage command amplitude correction unit 131 is the same as that of voltage command amplitude correction unit 130 in FIG. 4, and thus the detailed description will not be repeated.

In voltage command amplitude correction unit 131, multiplier 170 outputs a first amplitude correction amount VmgC1 corresponding to amplitude correction amount ΔVmg in FIG. 4. That is, first amplitude correction amount VmgC1 is indicated by the following equation (6). Also in FIG. 6, adjustment gain Kcmp is set as Kcmp=1.0 for ease of description.

$$VmgC1 = Klmt \cdot Kcmp \cdot (Vmgbs - VmgFB) \tag{6}$$

Automatic voltage regulator 200 operates when limit gain Klmt is set as Klmt=0, and outputs a second amplitude correction amount VmgC2 based on the feedback value (VmgFB) of the voltage amplitude at the interconnection point. On the other hand, when limit gain Klmt is set as Klmt=1.0, second amplitude correction amount VmgC2 is set as VmgC2=0.

Subtractor 210 outputs a value obtained by subtracting second amplitude correction amount VmgC2 from automatic voltage regulator 200, from first amplitude correction amount VmgC1 from multiplier 170, to subtractor 175, as amplitude correction amount ΔVmg.

Therefore, voltage command amplitude value Vmg* outputted from subtractor 175 is indicated by the following equation (7).

$$Vmg^* = Vmgbs - VmgC1 + VmgC2 \tag{7}$$

Figures 7, 8:
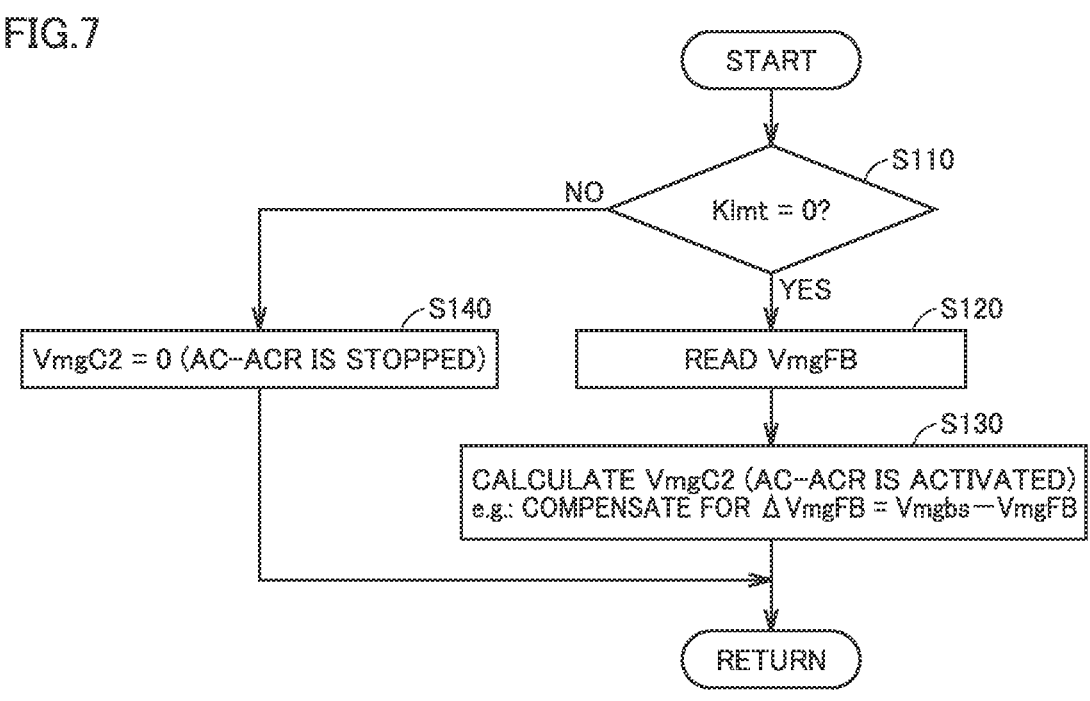
FIG. 7 is a flowchart illustrating operation of an automatic voltage regulator shown in FIG. 6.
FIG. 8 is a block diagram illustrating another example of application of the power conversion device in accordance with the present embodiment.

FIG. 7 shows a flowchart for illustrating operation of automatic voltage regulator 200.

As shown in FIG. 7, when limit gain Klmt is set as Klmt=0, it is determined as YES in step (hereinafter simply denoted as "S") S110, and automatic voltage regulator 200 is activated. Specifically, when automatic voltage regulator 200 reads feedback amplitude value VmgFB determined by amplitude computation unit 140 in S120, automatic voltage regulator 200 calculates second amplitude correction amount VmgC2 based on feedback amplitude value VmgFB in S130. Second amplitude correction amount VmgC2 can be set to compensate for a deviation ΔVmgFB of feedback amplitude value VmgFB with respect to reference amplitude value Vmgbs (ΔVmgFB=Vmgbs−VmgFB).

For example, second amplitude correction amount VmgC2 can be calculated according to the product of deviation ΔVmgFB and a proportional gain Kp (VmgC2=Kp·ΔVmgFB). Thereby, in the case of VmgFB<Vmgbs, second amplitude correction amount VmgC2 can be set as VmgC2>0, whereas in the case of VmgFB>Vmgbs, second amplitude correction amount VmgC2 can be set as VmgC2<0. Accordingly, feedback control can be performed to bring deviation ΔVmgFB close to zero.

In contrast, when limit gain Klmt is set as Klmt≠0 (that is, Klmt=1.0), it is determined as NO in S110, and automatic voltage regulator 200 is stopped. In this case, second amplitude correction amount VmgC2 is set as VmgC2=0 in S140.

Referring to FIG. 6 again, when limit gain Klmt is set as Klmt=1.0 and thereby first amplitude correction amount VmgC1 is set as VmgC1=Vmgbs−VmgFB, automatic voltage regulator 200 is stopped, and second amplitude correction amount VmgC2 is set as VmgC2=0. As a result, when the voltage amplitude at the interconnection point decreases to determination value Vmin due to an abnormality in power system 2, automatic voltage regulator 200 is stopped, and voltage amplitude command value Vmg* is set as described in FIG. 4.

In contrast, in the normal state where the voltage amplitude at the interconnection point does not decrease to determination value Vmin, and thus limit gain Klmt is set as Klmt=0, voltage amplitude command value Vmg* is set to correct reference amplitude value Vmgbs by second amplitude correction amount VmgC2 from automatic voltage regulator 200 (Vmg*=Vmgbs+VmgC2). Thereby, in the normal state where voltage command amplitude Vmg* is set substantially equal to reference amplitude value Vmgbs, feedback control that matches the voltage amplitude at the interconnection point with reference amplitude value Vmgbs is implemented.

According to current suppression control unit 101 of the variation in FIG. 6, in addition to the effect of current suppression control unit 100, it is possible to increase control accuracy of the output voltage of power converter 20 when the current suppression control is not performed (that is, in the normal state where a grounding accident or the like does not occur in power system 2).

In the example in FIG. 6, first amplitude correction amount VmgC1 corresponds to a "first correction amount", and second amplitude correction amount VmgC2 corresponds to a "second correction amount". Furthermore, automatic voltage regulator 200 corresponds to one embodiment of a "second correction computation unit". Moreover, subtractors 210 and 175 constitute one embodiment of an "amplitude correction unit".

<Example of Application of Power Conversion Device>

FIG. 8 shows another example of application of the power conversion device in accordance with the present embodiment.

In the example of application in FIG. 8, power conversion device 6 in accordance with the present embodiment has a circuit configuration that achieves a larger capacity by operating a plurality of (n) power converters 20(1) to 20(n) in parallel.

Specifically, each of power converters 20(1) to 20(n) converts a DC voltage from a DC power source 250 corresponding to power storage element 40 in FIG. 1 into a three-phase AC voltage, by switching control according to on/off control signals Sg(1) to Sg(n) from control device 10, as in power converter 20 in FIG. 1. That is, each of on/off control signals Sg(1) to Sg(n) shown in FIG. 8 includes on/off control signals for three phases (for example, Sgu, Sqv, and Sgw in FIG. 2).

Sinusoidal AC voltages outputted from power converters 20(1) to 20(n) are synthesized in a multiple voltage transformer 230 having multiple windings TR(1) to TR(n) whose primary sides are connected with power converters 20(1) to 20(n), respectively, and are outputted to a power line 215. Power line 215 is connected to a high-voltage power line 260 included in power system 2 in FIG. 1, via a main voltage transformer 220 corresponding to voltage transformer 3 in FIG. 1.

Also in the exemplary configuration in FIG. 8, control device 10 generates d-axis voltage command value Vd* and q-axis voltage command value Vq* according to the configuration in FIG. 4 or FIG. 6. Then, when d-axis voltage command value Vd* and q-axis voltage command value Vq* are subjected to two-phase/three-phase transformation, AC voltage command values Vu*, Vv*, and Vw* are separately generated for each of power converters 20(1) to 20(n). Thereby, power conversion device 6 can have a larger capacity by operating power converters 20(1) to 20(n) in parallel, using common voltage command values Vd* and Vq* in which the current suppression control in the present embodiment is reflected.

It should be noted that, although the present embodiment has described an example where the voltage command values for operating power converter 20 as a voltage source are generated in voltage control unit 12 to operate power converter 20 as a virtual synchronous generator, the voltage command values are not limited to be generated by the virtual synchronous generator control. That is, the power conversion device in accordance with the present embodiment is implemented by causing current suppression control unit 100 or 101 described in FIG. 4 or FIG. 6 to act on a voltage command value generated by any control scheme for operating power converter 20 as a voltage source that outputs an AC voltage having an amplitude and a phase which are different from those in power system 2.

Further, although the present embodiment has described an example where limit gain Klmt is set to two values, that is, 0 or 1.0, as shown in FIG. 5, limit gain Klmt may be set to be increased in multiple stages or continuously, in response to a decrease in AC voltage Vsys at interconnection point 9. In this case, there occurs a case where, when the current suppression control is turned on (0<Klmt≤1.0), even if adjustment gain Kcmp is set as Kcmp=1.0, voltage amplitude command Vmg* is set between feedback amplitude value VmgFB (the amplitude value of AC voltage Vsys) and reference amplitude value Vmg*.

The configuration illustrated as the embodiment described above is an example of the configuration of the present disclosure, and can be combined with another known technique, or can be modified, such as partially omitted, without departing from the gist of the present disclosure.

It should be understood that the embodiment disclosed herein is illustrative and non-restrictive in every respect. The scope of the present disclosure is defined by the scope of the claims, rather than the description above, and is intended to include any modifications within the scope and meaning equivalent to the scope of the claims.

REFERENCE SIGNS LIST

2: power system; 3: voltage transformer; 6: power conversion device; 7: current detector; 8: voltage detector; 9: interconnection point; 10: control device; 12: voltage control unit; 14: three-phase voltage command generation unit; 16: PWM control unit; 20: power converter; 21u, 21v, 21w: three-level inverter; 40: power storage element; 41, 42: capacitor; 100, 101: current suppression control unit; 110: polar coordinate transformation unit; 120: two-phase coordinate transformation unit; 130, 131: voltage command amplitude correction unit; 140: amplitude computation unit; 141, 142: low pass filter; 143, 144, 170: multiplier; 145: adder; 146: radical computation element; 150: amplitude deviation computation unit; 160: limiter; 161: adjustment gain multiplication unit; 175, 210: subtractor; 180: inverse transformation unit; 200: automatic voltage regulator; 215: power line; 220: main voltage transformer; 230: multiple voltage transformer; 260: high-voltage power line; Isys: AC current; Kcmp: adjustment gain; Klmt: limit gain; Sg(1) to Sg(n), Sgu, Sgv, Sgw: on/off control signal; TR(1) to TR(n): multiple windings; Vθ*: voltage phase command value; Vθbs: reference phase; Vsys: AC voltage (interconnection point); Vdbs, Vqbs: reference voltage command value; VdFB, VqFB: feedback voltage (interconnection point); Vd*, Vq*: voltage command value; VmgC1: first amplitude correction amount; VmgC2: second amplitude correction amount; VmgFB: feedback amplitude value; Vmgbs: reference amplitude value: Vt: determination value (decrease in voltage at interconnection point); Vu*, Vv*, Vw*: AC voltage command value.

The invention claimed is:

1. A power conversion device comprising:

at least one power converter configured to include switching elements, for converting DC power from a DC power source into AC power and outputting the AC power to a power system; and a control device to control power conversion in the power converter, the control device including a voltage control unit to generate a reference voltage command value for operating the power converter as a voltage source that outputs an AC voltage having a frequency and a phase which are different from those in the power system, a current suppression control unit to generate a voltage command value for the power converter using an AC voltage at an interconnection point of the power converter with respect to the power system and the reference voltage command value, and a switching control unit to control turning on/off of the switching elements of the power converter according to the voltage command value, the current suppression control unit having a first correction computation unit to compute a first correction amount for making an amplitude value of the voltage command value smaller than an amplitude value of the reference voltage command value, in response to a decrease in the AC voltage at the interconnection point, using an amplitude value of the AC voltage at the interconnection point, and an amplitude correction unit to set the amplitude value of the voltage command value by reflecting the first correction amount in the amplitude value of the reference voltage command value.

2. The power conversion device according to claim 1, wherein, when the amplitude value of the AC voltage at the interconnection point is more than a predefined determination value, the first correction computation unit sets the first correction amount to zero.

3. The power conversion device according to claim 1, wherein, when the amplitude value of the AC voltage at the interconnection point is less than or equal to a predefined determination value, the first correction computation unit sets the first correction amount according to a difference between the amplitude value of the reference voltage command value and the amplitude value of the AC voltage at the interconnection point.

4. The power conversion device according to claim 1, wherein, when the amplitude value of the AC voltage at the interconnection point is more than a predefined determination value, the first correction computation unit computes the first correction amount so as to set the amplitude value of the voltage command value according to the amplitude value of the reference voltage command value, and when the amplitude value of the AC voltage at the interconnection point is less than or equal to the predefined determination value, the first correction computation unit computes the first correction amount so as to set the amplitude value of the voltage command value according to the amplitude value of the AC voltage at the interconnection point.

5. The power conversion device according to claim 1, wherein the current suppression control unit further includes a second correction computation unit to compute a second correction amount according to the amplitude value of the AC voltage at the interconnection point when the amplitude value of the voltage command value is set substantially equal to the amplitude value of the reference voltage command value, and the amplitude correction unit sets the amplitude value of the voltage command value by reflecting the first and second correction amounts in the amplitude value of the reference voltage command value.

6. The power conversion device according to claim 5, wherein the second correction computation unit computes the second correction amount to compensate for a deviation of the amplitude value of the AC voltage at the interconnection point with respect to the amplitude value of the reference voltage command value.

7. The power conversion device according to claim 1, wherein a phase of the voltage command value is set according to a phase of the reference voltage command value.

8. The power conversion device according to claim 1, wherein a plurality of the power converters are arranged, the plurality of power converters are connected to the power system in parallel via a multiple voltage transformer, and the control device operates the plurality of power converters in parallel, according to the voltage command value that is common generated by the current suppression control unit.

9. A control device for a power converter configured to include switching elements, for converting DC power from a DC power source into AC power and outputting the AC power to a power system, the control device comprising:

a voltage control unit to generate a reference voltage command value for operating the power converter as a voltage source that outputs an AC voltage having a frequency and a phase which are different from those in the power system, a current suppression control unit to generate a voltage command value for the power converter using an AC voltage at an interconnection point of the power converter with respect to the power system and the reference voltage command value, and a switching control unit to control turning on/off of the switching elements of the power converter according to the voltage command value, the current suppression control unit including a first correction computation unit to compute a first correction amount for making an amplitude value of the voltage command value smaller than an amplitude value of the reference voltage command value, in response to a decrease in the AC voltage at the interconnection point, using an amplitude value of the AC voltage at the interconnection point, and an amplitude correction unit to set the amplitude value of the voltage command value by reflecting the first correction amount in the amplitude value of the reference voltage command value.

10. The control device according to claim 9, wherein, when the amplitude value of the AC voltage at the interconnection point is more than a predefined determination value, the first correction computation unit sets the first correction amount to zero.

11. The control device according to claim 9, wherein, when the amplitude value of the AC voltage at the interconnection point is less than or equal to a predefined determination value, the first correction computation unit sets the first correction amount according to a difference between the amplitude value of the reference voltage command value and the amplitude value of the AC voltage at the interconnection point.

12. The control device according to claim 9, wherein, when the amplitude value of the AC voltage at the interconnection point is more than a predefined determination value, the first correction computation unit computes the first correction amount so as to set the amplitude value of the voltage command value according to the amplitude value of the reference voltage command value, and when the amplitude value of the AC voltage at the interconnection point is less than or equal to the predefined determination value, the first correction computation unit computes the first correction amount so as to set the amplitude value of the voltage command value according to the amplitude value of the AC voltage at the interconnection point.

13. The control device according to claim 9, wherein
the current suppression control unit further includes a second correction computation unit to compute a second correction amount according to the amplitude value of the AC voltage at the interconnection point when the amplitude value of the voltage command value is set substantially equal to the amplitude value of the reference voltage command value, and
the amplitude correction unit sets the amplitude value of the voltage command value by reflecting the first and second correction amounts in the amplitude value of the reference voltage command value.

14. The control device according to claim 13, wherein the second correction computation unit computes the second correction amount to compensate for a deviation of the amplitude value of the AC voltage at the interconnection point with respect to the amplitude value of the reference voltage command value.

15. The control device according to claim 9, wherein a phase of the voltage command value is set according to a phase of the reference voltage command value.

* * * * *